UNITED STATES PATENT OFFICE 1,998,407

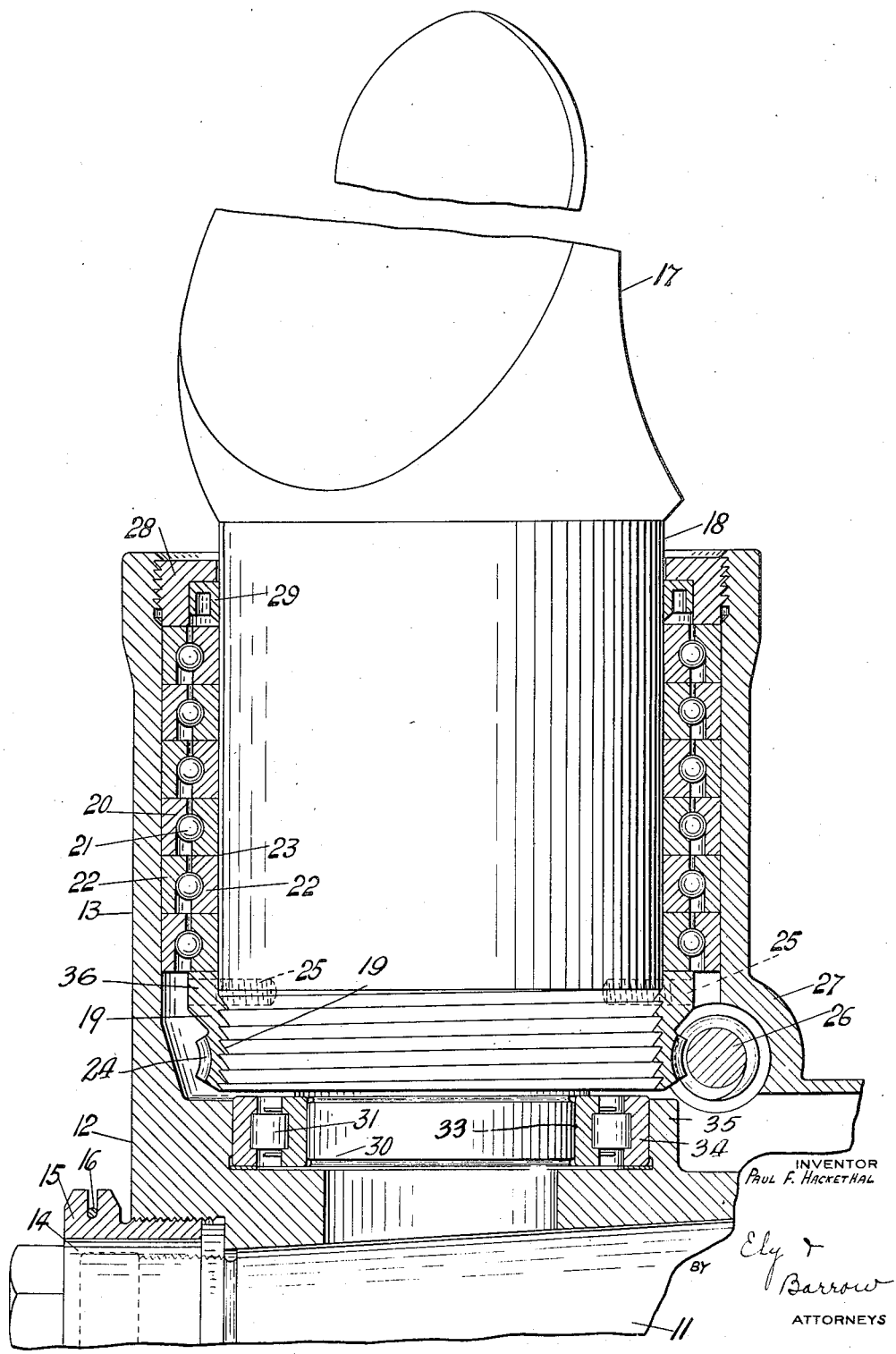

CONTROLLABLE PITCH PROPELLER

Paul F. Hackethal, Rocky River, Ohio, assignor, by mesne assignments, to Aviation Manufacturing Corporation, Chicago, Ill., a corporation of Delaware Application June 30, 1932, Serial No. 620,182

6 Claims. (Cl. 170—163)

This invention relates to thrust bearings, and more particularly to ball thrust bearings of the type adapted for use on certain kinds of devices where such bearings are subjected, not only to the usual strains and stresses of the ordinary parts of moving machinery, etc., but to terrific centrifugal strains. The type of centrifugal load referred to can be illustrated by using the example of the centrifugal load on an aeroplane propeller whirling at the rate of about 2100 revolutions per minute. At this rate of revolutions per minute the centrifugal load on the propeller will amount to approximately 42 or 43 tons. An aeroplane when making a power dive, frequently rotates the propeller at the rate of 3500 revolutions per minute, and in this case the centrifugal load on the propeller would amount to over 100 tons. Mechanisms for adjusting the pitch of aeroplane propellers in flight are being made, and bearings must be provided in the hubs on such propellers for distributing the load and reducing the friction in varying the pitch. Such bearing units must be adapted to withstand the centrifugal loads heretofore mentioned.

The type of bearing used on an adjustable pitch propeller must be limited to size and weight as these two factors materially concern the efficiency of the plane. In common practice a single roller or ball thrust bearing has been used and, due to the centrifugal load exertion on the propeller, the bearing balls sink into the bearing race, which condition is called brinnelling in the industry. This obviously destroys the practical working efficiency of the bearing. This problem in some types of work could be solved by using a relatively large bearing unit, but on aeroplane propellers the use of such a relatively large bearing unit is impractical.

I have discovered that the bearing problem presented on adjustable pitch propellers can be most satisfactorily solved by using a plurality of ordinary ball thrust bearings, superimposing one bearing upon the other. This superimposing of the various bearings one upon the other requires that the engaging faces of the bearings be accurately ground to the relatively high degree of precision necessary to obtain the proper relation of the bearing races to each other, and this process of grinding such faces forms the subject of a copending application filed by me June 30, 1932, bearing Serial No. 620,181.

When each of the superimposed bearings are ground to alignment and accurately aligned about the shank of a propeller blade the centrifugal load strain, instead of being imposed solely on one row of balls, and very likely ruining the effective service of such unit as heretofore described, will be divided, approximately evenly, among each of the ball rows. This division of the load will prevent any one bearing from being damaged by the balls making dents in the bearing race, as the load or stress carried by any one bearing is only a proportionate share of the total load, which load can be computed approximately as the total load on the propeller divided by the number of ball bearing rows. For example, if there is a centrifugal load of 60 tons on a propeller at a certain rate of revolutions per minute and only one single bearing is used, obviously this single bearing must be adapted to withstand a compression strain of 60 tons, a strain which would likely cause the balls to sink into the race, whereas, if, for example, six thrust bearings were used the compression strain on each would be only approximately ten tons. By thus superimposing a plurality of the ordinary type of thrust bearings around the shank of a propeller blade no appreciable size or weight is added to the propeller construction.

It is an object of this invention to provide a thrust bearing means adapted to withstand relatively high compression strains.

Another object is to provide bearing means adapted to accomplish the above object by using only ordinary thrust bearings.

The above and other objects of the invention are achieved by the apparatus illustrated in the accompanying drawing and described below, it being understood that the invention is not limited to the specific details shown and described.

The drawing is a longitudinal view, of an embodiment of my invention, applied to an aeroplane propeller with parts of the blade broken away.

On the drawing 11 indicates a propeller shaft or crankshaft of a motor (not shown), which is journaled in suitable bearings, also not shown. Keyed to the shaft 11 is a hub 12, formed with blade carrying sleeve 13 which may be formed with the hub or secured thereto by suitable means such as by welding or brazing. The hub 12 is fixed to the shaft 11 so that it cannot work loose by threading the end of the shaft 11, mounting thereon a cap 14 which is locked in place by a sleeve 15 threaded in opposite hand to the cap 14. A removable spring 16, fitting in aligned holes on the sleeve 15, locks the cap 14 and the sleeve 15 together.

A propeller blade 17 having a cylindrical end 18 threaded at its end with a buttress thread 19 is received in the sleeve 13. For convenience only one propeller blade is shown. It will, of course, be understood that one or more corresponding blades, in actual practise, are mounted in the hub. The blade 17 is adapted to turn in the sleeve 13 while the propeller unit is rotating. In order to allow the blade 17 to turn freely in the sleeve a bearing means is provided, comprising six ordinary thrust ball bearings 20 superimposed one on the other. Each of the ball bearings has a row of balls 21 and ball races 22. The mating faces 23 of each of the ball bearing units 20 are accurately ground or cut to alignment so that the tremendous centrifugal load along the blade 17 is transmitted evenly and uniformly by each bearing unit 20.

The means for rotating the blade 17 on its own axis to vary its pitch comprises a worm gear 24 formed on a ring 36 which is threaded to the buttress thread 19 which is formed on the shank 18 of the blade 17 and a worm 26 which is journaled in a housing 28 formed on the hub 12. Any suitable means for actuating the worm to rotate the blade may be used. The ring 36, on which the worm gear 24 is formed, is locked in place on the propeller shank by screws 25. The inner race 22 nearest the drive shaft 11 of the superimposed series of said races abuts against the outer end face of ring 36, so that the centrifugal thrust of the blade will be progressively transmitted to the entire series of inner races.

A ring 28 is buttress-threaded into the outer end of the bore sleeve 13 of the hub and the outermost race 20 of the series of outer races 22 abuts against the inner end face of said ring, so that the centrifugal thrust stresses of all of the bearing balls will be progressively transmitted from the outer races to the ring 28 and the sleeve 13. A gasket 29 in the ring 28 and around shank 18 retains the grease with which each assembly is preferably packed.

The inner end of each shank 18 is provided with a boss 30 which is of less diameter than the shank and a radial anti-friction bearing comprising an inner race 33 fitted around said boss, an outer race 34 fitted in a cylindrical socket 35 in the hub 12, and anti-friction elements 31 between said races. This bearing is provided to accurately position and retain the inner end of the shank on its true axis. The boss 30 and races 33 and 34 are disposed in the hub and between the threaded portion 19 of the shank and the shaft 11. This anti-friction bearing for the inner end of the shank of the blade co-acts with the series of bearings between the sleeve 13 and the shank 18, to prevent any cramping action between the shank of the blade and the sleeve on the hub, and to retain the shank in its true position for free rotation.

By forming the worm gear 24 on the collar 29, which is screw-threaded to the shank and serves as a thrust member for the group of inner races 22, and providing a radial bearing disposed radially between the worm gear and the axis of the propeller shaft 11. a construction is provided which can be readily manufactured, which results in a compact disposition of the parts, and which will efficiently journal the blade for free rotative adjustment in the hub. This construction also makes it possible to insert the assembled shank and bearings into the hub through the outer end of the sleeve 13.

The operation of the invention is relatively simple. Whenever the operator desires to change the pitch of the blade 17 he operates a lever which causes the worm 26, meshing with the worm gear 24, to vary the pitch of the blade. As this operation is designed to be accomplished while the propeller is revolving, it is obvious that the ball bearings will not only be subjected to the strains incident to the rotating of the blade end 18 in the sleeve 13 to vary the pitch, but are subjected in addition thereto, to a tremendous outward centrifugal thrust strain. The centrifugal thrust, instead of being transmitted through a single bearing is divided and distributed over the six ball bearings. This distribution of the centrifugal thrust load over the plurality of ball bearings prevents an undue strain on any one bearing by thus dividing the load, and causes greater efficiency in the wearing of the bearings.

It will, therefore, be apparent to one skilled in the art that the invention may be variously changed, used or modified without departing from the spirit of the invention or sacrificing the advantages thereof, and the embodiment of my invention is illustrative only and that my invention is not limited thereby.

What is claimed is:

1. In a controllable pitch propeller the combination of a propeller hub, a driven shaft to which the hub is secured, a sleeve integral with and projecting from the hub, a propeller blade mounted to revolve with the hub and having a shank journaled in the sleeve for pitch variation of the blade, a series of centrifugal thrust and radial bearings between the shank and the sleeve, each bearing comprising an outer race, an inner race and a series of anti-friction elements between each outer and inner race, the inner races being superimposed around the shank, the outer races being superimposed in the sleeve, the inner and outer races of each bearing having their mating faces accurately aligned so as to substantially equalize the thrust on the anti-friction elements of the bearings of the entire series, a collar on said shank adjacent its inner end, provided with means to transmit the thrust to the inner series of races, a ring secured at the outer end of the sleeve to receive the thrust from the series of outer races, and means for changing the pitch of the blade comprising a gear on said collar.

2. In a controllable pitch propeller the combination of a propeller hub, a driven shaft to which the hub is secured, a sleeve integral with and projecting from the hub, a propeller blade mounted to revolve with the hub and having a shank journaled in the sleeve for pitch variation of the blade, a series of centrifugal thrust and radial bearings between the shank and the sleeve, each bearing comprising an outer race, an inner race and a series of anti-friction elements between each outer and inner race, the inner races being superimposed around the shank, the outer races being superimposed in the sleeve, a collar secured on and adjacent the inner end of the shank and provided with means to transmit the thrust to the inner series of races, a ring secured at the outer end of the sleeve to receive the thrust from the series of outer races, the shank being provided inwardly of the collar with inwardly extending means, a radial bearing in the hub and around said inwardly extending means, and means for changing the pitch of the blade comprising a gear secured to the shank outwardly of the radial bearing.

3. In a controllable pitch propeller the combination of a propeller hub, a driven shaft to which the hub is secured, a sleeve integral with and projecting from the hub, a propeller blade mounted to revolve with the hub and having a shank journaled in the sleeve for pitch variation of the blade, a series of centrifugal thrust and radial bearings between the shank and the sleeve, each bearing comprising an outer race, an inner race and a series of anti-friction elements between each outer and inner race, the inner races being superimposed around the shank, the outer races being superimposed in the sleeve, a collar secured on and adjacent the inner end of the shank and provided with means to transmit the thrust to the inner series of races, a ring secured at the outer end of the sleeve to receive the thrust from the series of outer races, the shank being provided inwardly of the collar with inwardly extending means, a radial bearing in the hub and around said inwardly extending means, and means for changing the pitch of the blade comprising a gear on said collar, and a worm housed in the hub and meshing with said gear.

4. In a controllable pitch propeller the combination of a propeller hub, a driven shaft to which the hub is secured, a sleeve integral with and projecting from the hub, a propeller blade mounted to revolve with the hub and having a shank journaled in the sleeve for pitch variation of the blade, a series of centrifugal thrust and radial bearings between the shank and the sleeve, each bearing comprising an outer race, an inner race and a series of anti-friction elements between each outer and inner race, the inner races being superimposed around the shank, the outer races being superimposed in the sleeve, a collar secured on and adjacent the inner end of the shank and provided with means to transmit the thrust to the inner series of races, a ring secured at the outer end of the sleeve to receive the thrust from the series of outer races, the shank being provided inwardly of the collar with inwardly extending means, a radial bearing in the hub and around said inwardly extending means, the hub comprising a sleeve portion around the shaft, having a socket into which the radial bearing is disposed, and means for changing the pitch of the blade comprising a gear on the shank.

5. In a controllable pitch propeller the combination of a propeller hub, a driven shaft to which the hub is secured, a sleeve integral with and projecting from the hub, a propeller blade mounted to revolve with the hub and having a shank journaled in the sleeve for pitch variation of the blade, a series of centrifugal thrust and radial bearings between the shank and the sleeve, each bearing comprising an outer race, an inner race and a series of anti-friction elements between each outer and inner race, the inner races being superimposed around the shank, the outer races being superimposed in the sleeve, a collar secured on and adjacent the inner end of the shank and provided with means to transmit the thrust to the inner series of races, a ring secured at the outer end of the sleeve to receive the thrust from the series of outer races, a boss of smaller diameter than and extending inwardly from the shank, the hub being provided with a sleeve around the shaft having a bearing-socket into which the boss extends, and means for changing the pitch of the blade, comprising a gear disposed radially outwardly of the boss.

6. In a controllable pitch propeller the combination of a propeller hub, a driven shaft to which the hub is secured, a sleeve integral with and projecting from the hub, a propeller blade mounted to revolve with the hub and having a shank journaled in the sleeve for pitch variation of the blade, a series of centrifugal thrust and radial bearings between the shank and the sleeve, each bearing comprising an outer race, an inner race and a series of anti-friction elements between each outer and inner race, the inner races being superimposed around the shank, the outer races being superimposed in the sleeve, a collar screw-threaded to and adjacent the inner end of the shank and provided with means to transmit the thrust to the inner series of races, a ring secured at the outer end of the sleeve to receive the thrust from the series of outer races, the shank being provided inwardly of the collar with inwardly extending means, a radial bearing in the hub and around said inwardly extending means, and means for changing the pitch of the blades comprising a gear on said collar, and a worm housed in the hub and meshing with said gear.

PAUL F. HACKETHAL.